United States Patent
Kulshrestha et al.

(10) Patent No.: US 7,572,929 B2
(45) Date of Patent: Aug. 11, 2009

(54) DITHIOCARBONATE CONTAINING MACROMERS AND POLYMERS DERIVED THEREFROM

(75) Inventors: Ankur S. Kulshrestha, Jersey City, NJ (US); Kevin Cooper, Flemington, NJ (US); Walter R. Laredo, Hillsborough, NJ (US)

(73) Assignee: Ethicon, Inc. - USA, Somerville, NJ (US)

( * ) Notice: Subject to any disclaimer, the term of this patent is extended or adjusted under 35 U.S.C. 154(b) by 680 days.

(21) Appl. No.: 11/390,124

(22) Filed: Mar. 27, 2006

(65) Prior Publication Data

US 2007/0225460 A1    Sep. 27, 2007

(51) Int. Cl.
*C07C 329/18* (2006.01)
*C08F 28/06* (2006.01)

(52) U.S. Cl. .................. 558/247; 558/245; 536/122; 508/445

(58) Field of Classification Search .......... 558/247, 558/245; 526/257; 508/445; 536/122
See application file for complete search history.

(56) References Cited

U.S. PATENT DOCUMENTS

| | | | |
|---|---|---|---|
| 5,700,583 A | 12/1997 | Jamiolkowski et al. |
| 5,859,150 A | 1/1999 | Jamiolkowski et al. |
| 6,074,660 A | 6/2000 | Jamiolkowski et al. |
| 6,147,168 A | 11/2000 | Jamiolkowski et al. |
| 6,372,871 B1 | 4/2002 | Jimbo et al. |
| 6,972,315 B2 | 12/2005 | Gross et al. |

FOREIGN PATENT DOCUMENTS

| EP | 1506964 A1 | 2/2005 |
|---|---|---|
| JP | 2002201256 A * | 7/2002 |
| JP | 2003263921 A * | 9/2003 |
| JP | 2004323702 A * | 11/2004 |
| WO | WO 2005/016908 A1 | 2/2005 |

OTHER PUBLICATIONS

Endo et al, Journal of Polymer Science Part A:Polymer Chemistry, vol. 36, 1189-1195 (1998).
Endo et al, Macromolecules, 28, 5386-5387 (1995).
Endo et al, Macromol.Chem.Phys. 1999, 1909-1915 (1998).
Endo et al, Journal of Polymer Science Part A:Polymer Chemistry, vol. 36, 79-84 (1998).

* cited by examiner

*Primary Examiner*—Kelechi C Egwim

(57) ABSTRACT

Dithiocarbonate-containing macromer that contain biodegradable or water-soluble segments, and polymers derived from the reaction of these dithiocarbonate-containing macromers, are disclosed. The polymers derived from these dithiocarbonate-containing macromers with biodegradable or water-soluble segments are useful in medical and pharmaceutical applications.

9 Claims, No Drawings

DITHIOCARBONATE CONTAINING MACROMERS AND POLYMERS DERIVED THEREFROM

CROSS-REFERENCE TO RELATED APPLICATION

This application claims benefit to U.S. Nonprovisional application Ser. No. 11/390,008, filed Mar. 27, 2006 incorporated herein by reference in its entirety.

FIELD OF THE INVENTION

The present invention relates to dithiocarbonate-containing macromers and polymers derived therefrom. More specifically, it relates to certain biodegradable or water-soluble dithiocarbonate macromers and polymers derived therefrom that contain thioether linkages especially adapted for pharmaceutical and medical applications.

BACKGROUND OF THE INVENTION

Medical and pharmaceutical devices are frequently manufactured from biodegradable or water-soluble polymers. Biodegradable polymers contain biodegradable linkages that readily break down into small segments when exposed to moist body tissue or physiological enzymes. The segments are either absorbed by the body or passed by the body. More particularly, the biodegraded segments do not elicit permanent chronic foreign body reaction, because they are absorbed by the body or passed from the body such that no permanent trace or residual amount of the segment is retained by the body. Water-soluble polymers contain linkages that are dissolved in the body fluids and are subsequently passed by the body.

Examples of medical devices, which can be manufactured from biodegradable or water-soluble polymers, include sutures, suture anchors, screws and pins for fastening or securing tissues after a surgical procedure. Other examples include topical adhesives for securing tissue and internal sealants to suppress the leakage of blood or other fluids from tissue. Biodegradable or water-soluble polymers are also used in the manufacture of pharmaceuticals. Often, the polymers are used as carriers for the active pharmaceutical agent. In general, however, for both of these applications, properties such as biocompatibility, strength, proper flexibility, wettability, durability, and ease of delivery need to be optimized.

Dithiocarbonate polymers have been described in U.S. Pat. No. 6,372,871 B1. In this patent, dithiocarbonate is defined as a 5-membered cyclic dithiocarbonate. For example, dithiocarbonate-containing macromers have been shown to readily react with diamines to form polythiourethanes. These polymers can be utilized for applications such as wire coatings and inks where chemical and water resistance are important physical properties. Unfortunately, these polymers do not have hydrolyzable linkages that would make them suitable for medical or pharmaceutical applications.

Therefore, there is a desire for a new class of biodegradable or water-soluble dithiocarbonate-containing macromers and polymers derived therefrom that could be used for medical and pharmaceutical applications. The polymers ideally could be prepared into preformed devices or prepared in situ by delivering the reactants to a body cavity in a fluid form.

SUMMARY OF THE INVENTION

The invention is a dithiocarbonate-containing macromer that has the following formula depicted as Formula I:

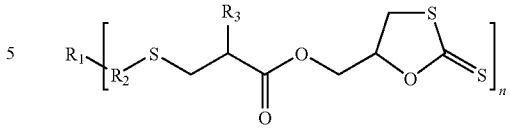

Formula I

Wherein n is an integer greater than or equal to two;

$R_1$ is selected from the group consisting of an alpha-, omega-diol containing from C-2 to C-22 carbon atoms; an alpha-, omega-diol containing ether linkages; and a polyol;

$R_2$ is a biodegradable or water-soluble linkage selected from the group consisting of an ester, an amide, a carbonate, an ester-amide, an orthoester, an anhydride, an imine, a phosphazene, a poly(peptide), a poly(hydroxy acid), a poly(orthocarbonate), a poly(anhydride), a poly(lactone), a poly(aminoacid), a poly(carbonate), poly(phosphonate), a poly(oxaester), a poly(alkylene diglycolate), a fatty acid polyester, a poly(ester-amide), a polydepsipeptide, a poly(orthoester), poly(phosphazene), poly(ethylene glycol), poly(ethylene oxide), poly(vinyl alcohol), poly(ethylene-co-vinyl alcohol), poly(acrylic acid), poly(ethylene-co-acrylic acid), poly(ethyloxazoline), polyvinylpyrrolidone, poly(ethylene-co-vinyl pyrrolidone), poly(maleic acid), poly(ethylene-co-maleic acid), poly(acrylamide), poly(ethylenimine), poly(ethylene oxide)-co-poly(propylene oxide) block copolymers, and combinations thereof; and $R_3$ is selected from the group consisting of hydrogen, methyl, ethyl, and propyl.

The invention is also a process for preparing this dithiocarbonate-containing macromer by reacting a thiol-reactive dithiocarbonate with a thiol.

Further, the invention is also a polymer that is the reaction product of the dithiocarbonate-containing macromer set forth in Formula I above.

The dithiocarbonate-containing polymers of this invention have hydrolyzable linkages that make them particularly useful for medical and pharmaceutical applications. In general, the polymers described herein can be adapted for use in any medical or pharmaceutical application where polymers are currently being utilized. For example, the polymers of the present invention are useful as tissue sealants and adhesives, in tissue augmentation, in hard tissue repair, as hemostatic agents, in adhesion prevention, in providing surface modifications, in tissue engineering applications, in medical devices such as suture anchors, sutures, staples, surgical tacks, clips, plates, and screws; intraocular lenses, contact lenses, as coatings of medical devices, and in drug/cell/gene delivery applications.

DETAILED DESCRIPTION OF THE INVENTION

In Formula I, the number chosen for subscript n will depend on the constituent chosen for $R_1$. Subscript n is an integer greater than or equal to 2. Preferably, n is an integer between 2-6, inclusive.

Examples of suitable C-2 to C-22 alpha-, omega-diols for $R_1$ of Formula I include but are not limited to ethylene glycol, 1,3-propanediol, 1,4-butanediol, 1,5-pentanediol, 1,6-hexanediol, 1,8-octanediol, and 1,12-dodecanediol. Examples of suitable alpha-, omega-diols containing ether linkages for $R_1$ of Formula I include but are not limited to diethylene glycol, triethylene glycol, tetraethylene glycol, pentaethylene glycol, hexaethylene glycol, heptaethylene glycol, and poly(ethylene glycol). Polyols, which can be chosen for $R_1$ of Formula I, include but are not limited to glycerol, erythritol, pentaerythritol, ethoxylated pentaerythritol, dipentaerythritol, xylitol, ribitol, sorbitol, 1,2,6-hexanetriol, 1,2,4-butanetriol, maltose, sucrose, and lactose. The most preferred substituents for $R_1$ are poly(ethylene glycol), glycerol, pentaerythritol, ethoxylated pentaerytritol and dipentaerythritol.

Biodegradable linkages, which can be chosen for $R_2$ of Formula I, include, but are not limited to ester, amide, carbonates, ester-amides, orthoester, anhydride, imine, phosphazene, and other biodegradable linkages. In yet another embodiment the biodegradable linkage is found within a polymer that includes, but is not limited to, poly(peptide)s, poly(hydroxy acid)s, poly(orthocarbonate)s, poly(anhydride)s, poly(lactone)s, poly(amino acid)s, poly(carbonate)s, poly(phosphonate)s, poly(oxaester)s, poly(alkylene diglycolate)s, fatty acid polyesters, poly(ester-amides), polydepsipeptides, poly(orthoesters), and poly(phosphazenes). Examples of poly(lactone)s include poly(glycolide), poly(d,l-lactide), poly(l-lactide), poly(epsilon-caprolactone), poly(p-dioxanone), poly(trimethylene carbonate) and copolymers thereof. A water-soluble linkage which can be chosen for $R_2$ of Formula I may be selected from poly(ethylene glycol), poly(ethylene oxide), poly(vinyl alcohol), poly(ethylene-co-vinyl alcohol), poly(acrylic acid), poly(ethylene-co-acrylic acid), poly(ethyloxazoline), polyvinylpyrrolidone, poly(ethylene-co-vinyl pyrrolidone), poly(maleic acid), poly(ethylene-co-maleic acid), poly(acrylamide), poly(ethylenimine), or poly(ethylene oxide)-co-poly(propylene oxide) block copolymers. The preferred substituents for $R_2$ are poly(lactone)s, poly(oxaester)s, poly(hydroxy acid)s, poly(acrylic acid) poly(vinyl pyrrolidone), and poly(ethylene glycol). The most preferred substituents for $R_2$ are poly(lactone)s, which will provide a biodegradable linkage, and poly(ethylene glycol), which will provide a water-soluble linkage.

The pendant group $R_3$ is most preferably hydrogen and methyl.

The dithiocarbonate-containing macromer depicted in Formula I of this invention can be prepared by reacting a thiol-reactive dithiocarbonate (Formula II) with a thiol (Formula III) in accordance with the following reaction:

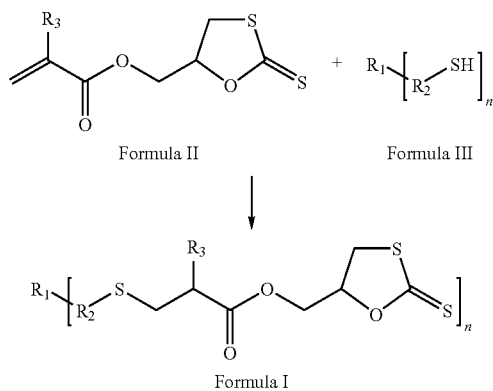

The substituents chosen for n, $R_1$, $R_2$ and $R_3$, and the preferred and most preferred substituents, are the same as previously described.

The free radical reaction of Formula II with Formula III is carried out under an oxygen free atmosphere at 0 to 150 degrees Celsius, preferably 40 to 120 degrees Celsius, for 1 to 24 hours in the presence of a thermal initiator such as 2,2'-azobisisobutyronitrile, 2,2'-azobis-2-methylbutyronitrile, 2,2'-azobisvaleronitrile and solvent. Suitable solvents are acetonitrile and dioxane. The free radical reaction of Formula II with Formula III can also be carried out using visible or ultra-violet light and a photoinitiator. Conjugate addition reaction (also called Michael addition reaction) of Formula II with Formula III is carried out at physiological temperatures (about 37 degrees Celsius) and under basic conditions (i.e. pH≧physiological pH (about 7.4) for 15 minutes to 24 hours.

The preferred reaction conditions are the free radical reaction of Formula II with Formula III carried out under oxygen free atmosphere at 0 to 150 degrees Celsius, preferably 40 to 120 degrees Celsius, for 1 to 24 hours in the presence of the thermal initiator 2,2'-azobisisobutyronitrile and dioxane.

The preferred thiol-reactive dithiocarbonates depicted in Formula II are (2-thioxo-1,3-oxathiolan-5-yl)methyl methacrylate ($R_3$ is methyl) (TCI America, Portland, Oreg.) and (2-Thioxo-1,3-oxathiolan-5-yl)methyl acrylate ($R_3$ is hydrogen) synthesized as described in Example 1a set forth below.

One of skill in the art will recognize that alternative thiol-reactive groups may be contemplated such as, ester, anhydride, ketene, isocyanate, monounsaturated alkenyl and the like.

The preferred biodegradable or water-soluble thiols depicted in Formula III include but are not limited to: proteins containing cysteine residues, albumin, glutathione, 3,6-dioxa-1,8-octanedithiol (TCI America, Portland, Oreg.), oligo(oxyethylene) dithiols, pentaerythritol poly(ethylene glycol) ether tetra-sulfhydryl, Sorbitol poly(ethylene glycol) ether hexa-sulfhydryl (with a preferred molecular weight in the range of about 5000 to 20,000, SunBio Inc., Orinda, Calif.), dimercaptosuccinic acid (Epochem Co. Ltd, Shangai, China), dihydrolipoic acid [HOOC—(CH2)4-CH(SH)—CH2-CH2SH, Geronova Research Inc., Reno, Nev.), dithiothreitol [HS—CH2-CH(OH)—CH(OH)—CH2SH , Sigma Aldrich Co., Milwaukee, Wis.], pentaerythritol tetrathioglycolate, pentaerythritol tetra(3-mercaptopropionate), dipentaerythritol hexakis(thioglycolate) (DPHTG) (Austin Chemicals, Buffalo Grove, Ill.), and ethoxylated pentaerythritol(PP150)tetrakis(3-mercapto propionate) (Austin Chemicals, Buffalo Grove, Ill.).

The most preferred thiols are pentaerythritol tetrathioglycolate ($R_1$ is pentaerythritol (a polyol), $R_2$ is glycolate (an ester), and n is 4), pentaerythritol tetra(3-mercaptopropionate) ($R_1$ is pentaerythritol (a polyol), $R_2$ is propionate (an ester), and n is 4), dipentaerythritol hexakis(thioglycolate) (DPHTG) ($R_1$ is dipentaerythritol (a polyol), $R_2$ is glycolate (an ester), and n is 6) (Austin Chemicals, Buffalo Grove, Ill.), and ethoxylated pentaerythritol(PP150)tetrakis(3-mercapto propionate) ($R_1$ is ethoxylated pentaerythritol (a polyol), $R_2$ is propionate (an ester), and n is 4) (Austin Chemicals, Buffalo Grove, Ill.).

The polymers of this invention are the reaction product of the dithiocarbonate-containing macromer depicted in Formula I and a dithiocarbonate reactant. Dithiocarbonate reactants can be di- or polyfunctional. Dithiocarbonate reactants include but are not limited to thiols, hydroxyls, and amines. Examples of dithiocarbonate-reactive thiols include proteins containing thiols, such as thiols in cysteine residues, and poly(ethylene glycol)s (PEGs) containing thiols, such as 6-arm sulfydhryl PEG (SunBio Company, Orinda, Calif.) and dipentaerythritol hexakis thioglygolate (DPHTG) (Austin Chemicals, Buffalo Grove, Ill.). Hydroxyls include proteins containing hydroxyls and PEGs containing hydroxyls. Examples of amines that can be used in the present invention include but are not limited to polyethylenimines, polyoxypropylenediamines available under the tradename JEFFAM-INES (Huntsman Corporation, Houston, Tex.), spermine, spermidine, polyamidoaminedendrimers, cysteines, and proteins containing amines. The dithiocarbonate reactants are preferably amines. The preferred amines are spermine and spermidine.

The dithiocarbonate reactant may also be the reaction product of latent reactive moieties and water. The latent reactive moieties can be di- or polyfunctional and include imines, ketimines and aldimines. Examples of compounds containing latent reactive moieties are N,N-bis(4-methylpentan-2-ylidene)ethane-1,2-diamine (Epikure 3502, Resolution Performance Products, Houston, Tex.), N,N-bis(3-methylbutan-2-ylidene)ethane-1,2-diamine, and N-3-(3-methylbutan-2-ylideneamino)propyl-N-(3-methylbutan-2-ylidene)butane-1,4-diamine. When these latent reactive moieties come in contact with water they become dithiocarbonate reactants.

The polymers of the present invention may also be the reaction product of the dithiocarbonates-containing macromer depicted in Formula I, a dithiocarbonate reactant, and an additional crosslinking reactant. The reaction product of the dithiocarbonate-containing macromer and dithiocarbonate reactant described above results in a polymer with a pendant thiol moiety. The polymer can therefore be further reacted with an additional crosslinking reactant. Additional crosslinking reactants include epoxy, a maleimide, a vinyl sulfone, a conjugated unsaturated bond, a conjugated unsaturated moiety such as an acrylate, an acrylamide, a quinone, or a vinyl pyridinium, an activated ester such as ester derivatives of phosphoesters, esters of substituted hydroxylamines such as those of N-hydroxy-phthalimide, N-hydroxy-succinimide, and N-hydroxy-glutarimide, esters of 1-hydroxybenzotriazole, 3-hydroxy-3, 4-dihydro-benzotriazine-4-one and 3-hydroxy-3,4-dihydro-quinazoline-4-one, derivatives of carbonylimidazole, isocyanates, carbonyldiimidazole, sulfonyl chloride, aryl halides, aldehydes, succinimidyl esters, thiolactones and imidoesters. Additional crosslinking reactants further include ortho pyridyl disulfide, 3-nitro-2-pyridenesulfenyl, 2-nitro-5-thiocyanobenzoic acid, 5,5'-dithio-bis (2-nitrobenzoic acid), derivatives of methane-thiosulfate, and 2,4-dinitrophenyl cysteinyl disulfides, iodoacetamide, N-ethylmaleimide and other maleimides, including dextran maleimides, derivatives of O-methyl-isourea, ethyleneimines, aziridines, and 4-(aminosulfonyl)-7-fluoro-2,1,3-benzoxadiazole. The preferred additional crosslinking reactants are epoxy, an acrylate, an isocyanate, a thiolactone and an N-hydroxysuccinimide.

The polymers of the present invention can be obtained by dispersing and mixing the dithiocarbonate-containing macromer of Formula I with the selected dithiocarbonate reactant at a temperature between room temperature and physiological temperature (about 32-60 degrees Celsius). However, one of the various biocompatible solvents including, but not limited to, polyoxyethylene sorbitan fatty acid ester sold under the tradename TWEEN (ICI Americas Inc. Bridgewater, N.J.) and poly(ethylene glycol) may be incorporated, if necessary in a 0.2 to 100-fold amount (by weight) of the co-reactants. A catalyst can also be used to accelerate the reaction if necessary.

The most preferred polymer reaction conditions is one in which the dithiocarbonate-containing macromer depicted in Formula I is mixed, without any solvent or catalyst, with the dithiocarbonate reactant at 32-40 degrees Celsius.

The reactivity of the reactants of the present invention will depend greatly on the nature of the functional moieties. The pH of the reaction environment is also an important factor in this consideration. In particular, unprotonated amines and thiols are generally more reactive than protonated amines and thiols. Unprotonated thiols are substantially more reactive than an unprotonated amine. For example, addition reactions involving a conjugated unsaturation, such as an acrylate, with a thiol will often be best carried out at a pH of approximately 9, where most of the thiols of interest are unprotonated (and thus more reactive). In one embodiment, reactions are conducted in buffered aqueous solutions at pH 5 to 12. In yet another embodiment, the reactions are carried out at a physiological pH of 7 to 7.4. Other chemical synthesis modifiers can be utilized to effect reactivity e.g., catalysts, activators, initiators, temperature or other stimuli.

It may be desirable, and in some cases essential, to use molar equivalent quantities of the reactants. In some cases, molar excess of a reactant may be added to compensate for side reactions such as reactions due to hydrolysis of the functional moiety.

If more suitable to the reactants used to prepare the polymers of the present invention, such as for solids, the reactions may also occur in aqueous solutions. If more suitable to the reactants used to prepare the polymers of the present invention, such as for reactants that are solids and that are not readily water-soluble, the reactions may also occur in organic solvents. Aqueous solutions or organic solvents may also be added to improve the reaction speed or to adjust the viscosity of a given formulation.

The polymers described herein can be linear, branched, or crosslinked. These polymers can also have various physical forms such as liquid, wax, solid, semi-solid, gels such as hydrogels, elastic solid, viscoelastic solid (like gelatin), a viscoelastic liquid (like a typical gel that can be induced to flow, for example, a gel like petroleum jelly), a viscoelastic liquid that is formed of gel microparticles or even a viscous liquid of a considerably higher viscosity than any of the reactants when mixed together. The term "gel" refers to the state of matter between liquid and solid. As such, a "gel" has some of the properties of a liquid (i.e., the shape is resilient and deformable) and some of the properties of a solid (i.e., the shape is discrete enough to maintain three dimensions on a two dimensional surface.) The preferred physical forms are elastic solid or viscoelastic solid.

The polymers of the present invention that are the reaction product of the dithiocarbonate-containing macromer and dithiocarbonate reactant can be used in a variety of different pharmaceutical and medical applications. In general, the polymers described herein can be adapted for use in any medical or pharmaceutical application where polymers are currently being utilized. For example, the polymers of the present invention are useful as tissue sealants and adhesives, in tissue augmentation (i.e., fillers in soft tissue repair), in hard tissue repair such as bone replacement materials, as hemostatic agents, in preventing tissue adhesions (adhesion prevention), in providing surface modifications, in tissue engineering applications, in medical devices such as suture anchors, sutures, staples, surgical tacks, clips, plates, and screws; intraocular lenses, contact lenses, coating of medical devices, and in drug/cell/gene delivery applications. One of skill in the art having the benefit of the disclosure of this invention will be able to determine the appropriate administration of a polymer of the present invention.

In one embodiment, the reactions of the present invention occur in situ, meaning they occur at local sites such as on organs or tissues in a living animal or human body. In another embodiment, the reactions do not release heat of polymerization that increases the local temperature to more than 60 degrees Celsius. In yet another embodiment, any reaction leading to gelation occurs within 20 minutes; in still yet another embodiment within 5 minutes; and in still yet another embodiment within 1 minute. Such polymers of the present invention form a gel that has sufficient adhesive and cohesive strength to become anchored in place. It should be understood that in some applications, adhesive and cohesive strength and gelling are not a prerequisite.

For the reactions of the present invention that occur in situ, the reactants utilized in the present invention are generally delivered to the site of administration in such a way that the reactants come into contact with one another for the first time at the site of administration, or immediately preceding administration. Thus, in one embodiment, the polymer reactants of the present invention are delivered to the site of administration using an apparatus that allows the components to be delivered separately. Such delivery systems usually involve individualized compartments to hold the reactants separately with a single or multihead device that delivers, for example, a paste, a spray, a liquid, or a solid. The reactants of the present invention can be administered, for example, with a syringe and needle or a variety of devices. It is also envisioned that the reactants could be provided in the form of a kit comprising a device containing the reactants; the device comprising an outlet for said reactants, an ejector for expelling said reactants and a hollow tubular member fitted to said outlet for administering the reactants into an animal or human.

Alternatively, the polymer reactants can be delivered separately using any type of controllable extrusion system, or they can be delivered manually in the form of separate pastes, liquids or dry powders, and mixed together manually at the site of administration. Many devices that are adapted for delivery of multi-component compositions are well known in the art and can also be used in the practice of the present invention.

Alternatively, the reactants of the present invention can be prepared in an inactive form as either a liquid or powder. Such reactants can then be supplied in a premixed form and activated after application to the site, or immediately beforehand, by applying an activator. In one embodiment, the activator is a buffer solution that will activate the formation of the polymer once mixed therewith.

In another embodiment, for applications where the polymer resulting from the dithiocarbonate-containing macromer and the dithiocarbonate reactant of the present invention need not be delivered to a site and formed in situ. The polymer can be prepared in advance and take a variety of liquid or solid forms depending upon the application of interest as previously described herein.

Optional materials may be added to one more of the reactants to be incorporated into the resultant polymers of the present invention, or may be separately administered. Optional materials include but are not limited to visualization agents, formulation enhancers, such as colorants, diluents, odorants, carriers, excipients, stabilizers or the like.

The reactants, and therefore the polymers of the present invention, may further contain visualization agents to improve their visibility during surgical procedures. Visualization agents may be selected from among any of the various colored substances or dyes suitable for use in implantable medical devices, such as Food Drug & Cosmetic (FD&C) dyes number 3 and number 6, eosin, methylene blue, indocyanine green, or dyes normally found in synthetic surgical sutures. In one embodiment, the visualization agent is green, blue, or violet. The visualization agent may or may not become incorporated into the polymer. In one embodiment, the visualization agent does not have a functional moiety capable of reacting with the reactants of the present invention.

Additional visualization agents may be used such as fluorescent compounds (e.g., fluorescein, eosin, green or yellow fluorescent dyes under visible light), x-ray contrast agents (e.g., iodinated compounds) for visibility under x-ray imaging equipment, ultrasonic contrast agents, or magnetic resonance imaging (MRI) contrast agents (e.g., Gadolinium containing compounds).

The visualization agent may be used in small quantities, in one embodiment less than 1 percent (weight/volume); in another embodiment less than 0.01 percent (weight/volume); and in yet another embodiment less than 0.001 percent (weight/volume).

The examples set forth below are for illustration purposes only and are not intended to limit the scope of the claimed invention in any way. Numerous additional embodiments within the scope and spirit of the invention will become readily apparent to those skilled in the art.

The dithiocarbonate-containing macromer depicted in Formula I and polymers derived therefrom described herein were characterized via differential scanning calorimetry (DSC), gel permeation chromatography (GPC), and nuclear magnetic resonance (NMR) spectroscopy. DSC measurements were performed on a 2920 Modulated Differential Scanning Calorimeter from TA Instruments using aluminum sample pans and sample weights of 5-10 milligrams. Samples were heated from room temperature to 100 degrees Celsius at a rate of 10 degrees Celsius per minute, quenched to −40 degrees Celsius at a rate of 30 degrees Celsius per minute, and heated a second time to 100 degrees Celsius at a rate of 10 degrees per minute. For GPC, a Waters System with Millennium 32 Software and a 410 Refractive Index Detector were used.

EXAMPLES

Example 1a

Synthesis of (2-Thioxo-1,3-oxathiolan-5-yl)methyl acrylate

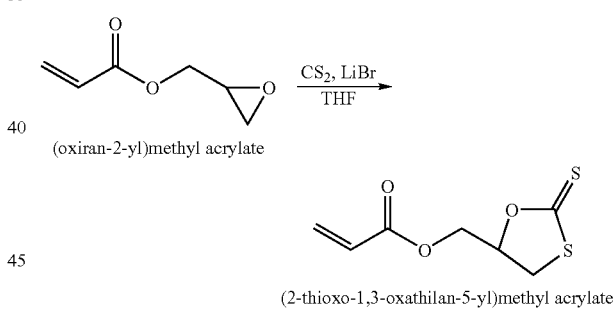

(oxiran-2-yl)methyl acrylate (2-thioxo-1,3-oxathilan-5-yl)methyl acrylate

Into a flame dried 2 liter round bottom flask equipped with nitrogen inlet was dissolved 40 grams (312 millimoles) of (oxiran-2-yl) methyl acrylate (Pfaltz and Bauer Co., Waterbury, Conn.) and 1 gram of lithium bromide (Aldrich, Milwaukee, Wis.) in 300 milliliters of anhydrous tetrahydrofuran (Aldrich, Milwaukee, Wis.). 31 grams (410 millimoles) of carbon disulfide were added dropwise to the magnetically stirred solution via a flame dried addition funnel. The reaction was stirred at room temperature for 4 hours then heated to 45 degrees Celsius and continued stirring for 30 hours. The tetrahydrofuran solvent was removed by rotoevaporation under reduced pressure. The resultant product was purified by column chromatography using silica gel (70-230 mesh, 60 angstrom, Aldrich, Milwaukee, Wis.) with 70/30 hexane/acetone as the mobile phase. The reaction product was isolated as an orange colored liquid and was characterized by $^1$H NMR spectroscopy using a Varian Unity Plus Spectrometer. $^1$H NMR (400 MHz,CDCl$_3$), δ=6.5 (dd, 1H), δ=6.2 (m, 1H), δ=5.9 (dd, 1H), δ=5.4 (dd, 1H), δ=4.5 (bm, 1H), δ=3.5-3.75 (bm, 1H), δ=2.9 (m, 1H), δ=2.7 (m, 1H)

Example 1b

Synthesis of 4-armed dithiocarbonate

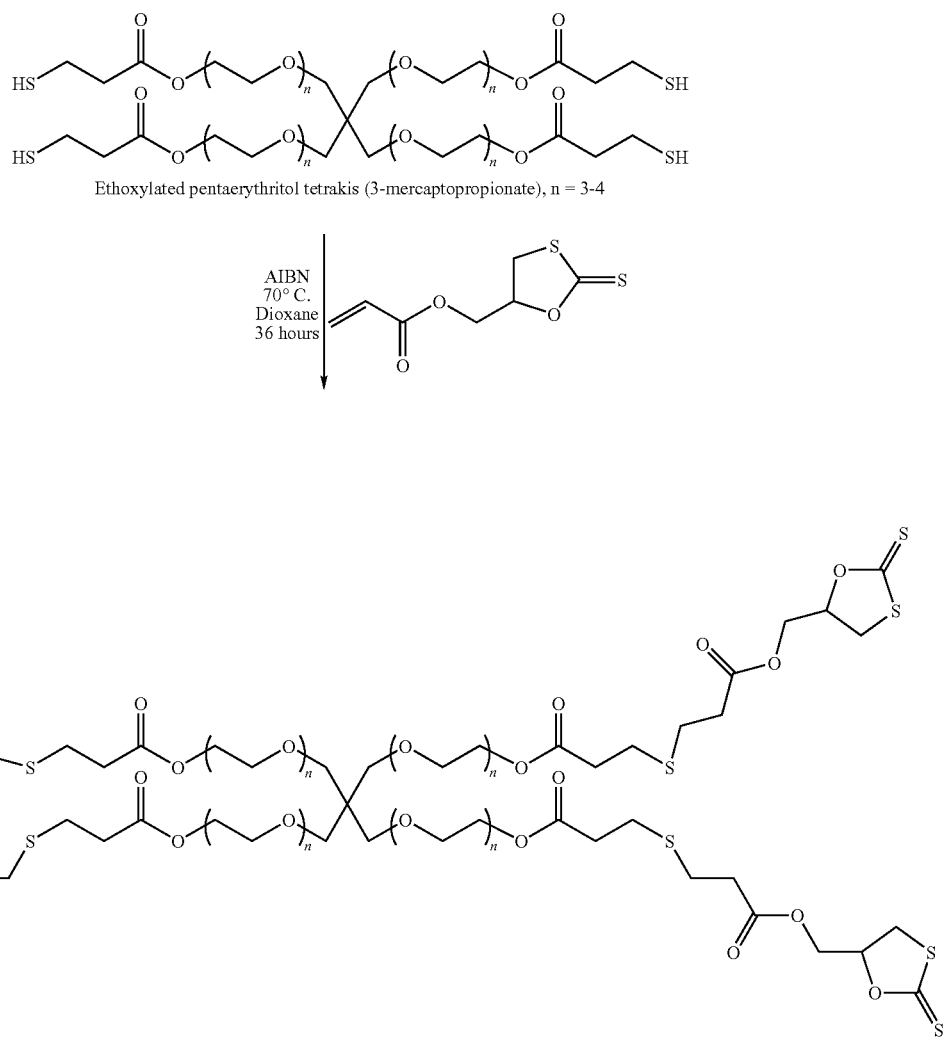

A flame dried 1000 milliliter round bottom flask equipped with a nitrogen inlet was charged with 47.0 grams (46.3 millimoles) of ethoxylated pentaerythritol tetrakis(3-mercaptopropionate) (PP150-TMP) (Austin Chemicals, Buffalo Grove, Ill.), 37.8 grams (185 millimoles) of (2-thioxo-1,3-oxathiolan-5-yl)acrylate (Pfaltz and Bauer, Waterbury, Conn.) and 300 milliliters of dioxane Aldrich, Milwaukee, Wis.). 605 milligrams (4 millimoles) of azobisisobutyronitrile (AIBN) (Aldrich, Milwaukee, Wis.) initiator were added to the solution with magnetic stirring. The reaction was heated to 70 degrees Celsius and held there for 36 hours. The dioxane solvent was subsequently removed by rotoevaporation under reduced pressure and the resultant thioether-linked dithiocarbonate was purified by column chromatography using silica gel (70-230 mesh, 60 Angstrom, Aldrich, Milwaukee) and 30/70 v/v (volume/volume) hexane/acetone as the mobile phase. The resultant dithiocarbonate-containing macromer was isolated as a dark orange viscous liquid and characterized by $^1$H NMR where the disappearance of signals at δ=6.5 (dd, 1H), δ=6.2 (m, 1H) and δ=5.9 (dd, 1H) corresponding to the protons of the double bond confirmed the complete consumption and addition of thiols on to the double bond of (2-thioxo-1,3-oxathiolan-5-yl)acrylate.

Example 2

Polymer Synthesis from 4-armed dithiocarbonate-containing macromer and diamine

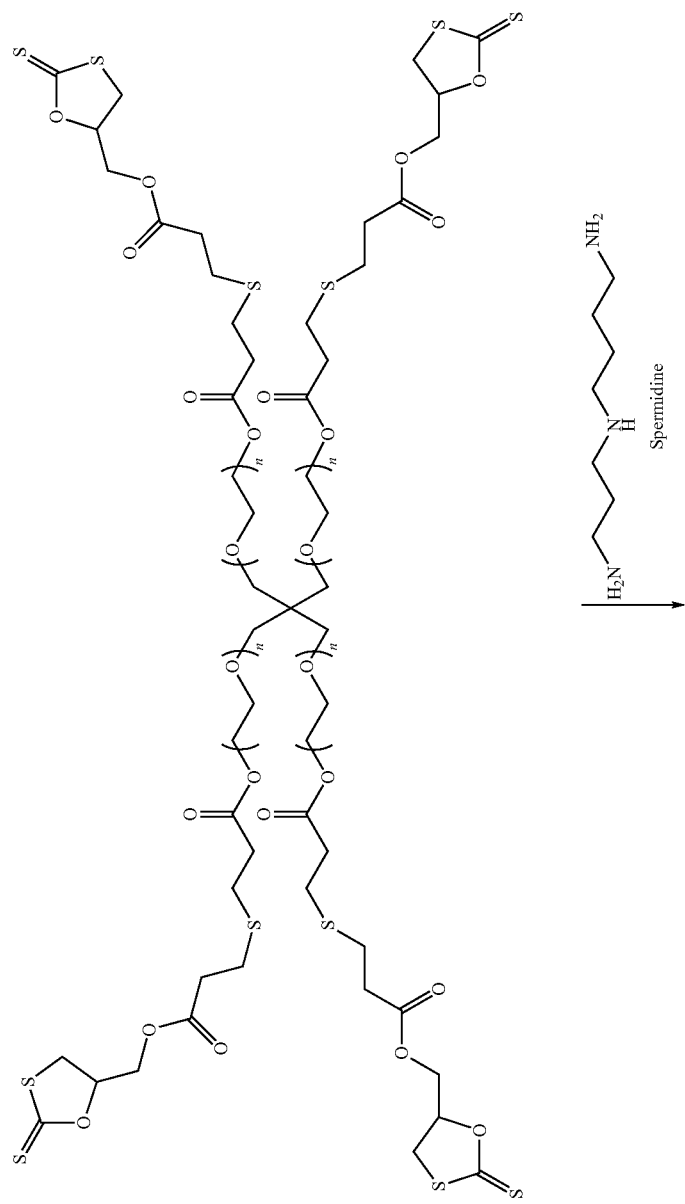

-continued
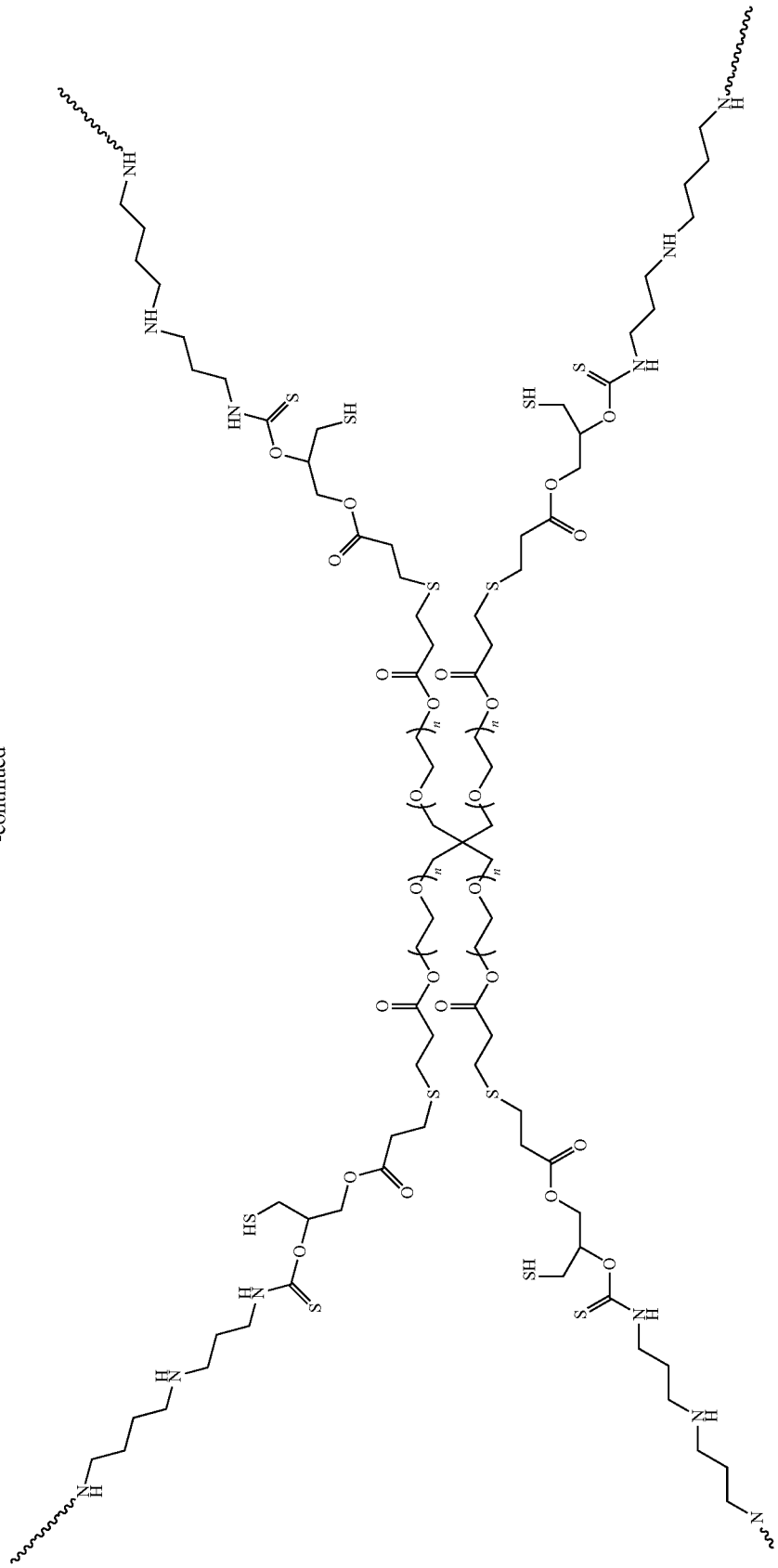

A flame dried 20 milliliter vial was charged with 10.0 grams (5.5 millimoles) of the four-armed dithiocarbonate-containing macromer synthesized in Example 1b and 1.6 grams (11 millimoles) of spermidine (Aldrich, Milwaukee, Wis.). The reaction mixture was stirred at room temperature for 2 minutes to form a polymeric gel. The polymeric gel was insoluble in hexafluoroisopropanol and was thus characterized to be a crosslinked polymeric gel.

The crosslinked polymer was tested for degradation by measuring percent weight loss under physiological conditions. The crosslinked polymer was prepared as described above and cut into strips of approximately equal weight. The strips were weighed at day zero then percent weight loss of the crosslinked polymer strips was determined after 14 and 28 days in phosphate buffered saline pH=7.4 at 37 degrees Celsius. The crosslinked polymer strips were dried under vacuum (30 inches of mercury) at room temperature for 2 days prior to weighing at each time point. Three strips were weighed at each timepoint and the average percent weight loss of these crosslinked polymer strips was determined. There was a 55 percent average weight loss after 14 days and a 60 percent average weight loss after 28 days. The weight loss observed in this degradation study shows that the crosslinked dithiocarbonate-containing polymers were biodegradable.

We claim:

1. A dithiocarbonate-containing macromer having the formula:

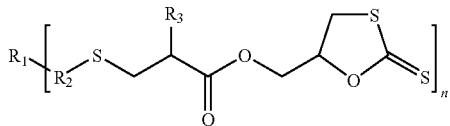

wherein n is an integer greater than or equal to two;
$R_1$ is selected from the group consisting of an alpha-, omega-diol containing from C-2 to C-22 carbon atoms; an alpha-, omega-diol containing ether linkages; and a polyol; and
$R_2$ is a biodegradable or water-soluble linkage selected from the group consisting of an ester, an amide, a carbonate, an ester-amide, an orthoester, an anhydride, an imine, a phosphazene, a poly(peptide), a poly(hydroxy acid), a poly(orthocarbonate), a poly(anhydride), a poly(lactone), a poly(aminoacid), a poly(carbonate), poly(phosphonate), a poly(oxaester), a poly(alkylene diglycolate), a fatty acid polyester, a poly(ester-amide), a polydepsipeptide, a poly(orthoester), poly(phosphazene), poly(ethylene glycol), poly(ethylene oxide), poly(vinyl alcohol), poly(ethylene-co-vinyl alcohol), poly(acrylic acid), poly(ethylene-co-acrylic acid), poly(ethyloxazoline), polyvinylpyrrolidone, poly(ethylene-co-vinyl pyrrolidone), poly(maleic acid), poly(ethylene-co-maleic acid), poly(acrylamide), poly(ethylenimine), poly(ethylene oxide)-co-poly(propylene oxide) block copolymers, and combinations thereof; and
$R_3$ is selected from the group consisting of hydrogen, methyl, ethyl, and propyl.

2. The dithiocarbonate of claim 1 wherein n is an integer between 2 to 6, inclusive; $R_1$ is selected from the group consisting of ethylene glycol, 1,3-propanediol, 1,4-butanediol, 1,5-pentanediol, 1,6-hexanediol, 1,8-octanediol, 1,12-dodecanediol, diethylene glycol, triethylene glycol, tetraethylene glycol, pentaethylene glycol, hexaethylene glycol, heptaethylene glycol, and poly(ethylene glycol), glycerol, erythritol, pentaerythritol, ethoxylated pentaerythritol, dipentaerythritol, xylitol, ribitol, sorbitol, 1,2,6-hexanetriol, 1,2,4-butanetriol, maltose, sucrose, and lactose; $R_2$ is selected from the group consisting of poly(lactone), poly(oxaester), poly(hydroxy acid), poly(acrylic acid), polyvinylpyrrolidone, and poly(ethylene glycol); and $R_3$ is selected from the group consisting of hydrogen and methyl.

3. The dithiocarbonate of claim 1 wherein n is an integer between 2 to 6, inclusive; $R_1$ is selected from the group consisting of poly(ethylene glycol), glycerol, pentaerythritol, ethoxylated pentaerythritol, and dipentaerythritol; $R_2$ is selected from the group consisting of poly(lactone)and poly(ethylene glycol); and $R_3$ is selected from the group consisting of hydrogen and methyl.

4. A process for preparing a dithiocarbonate comprising the step of reacting a thiol-reactive dithiocarbonate of the following formula:

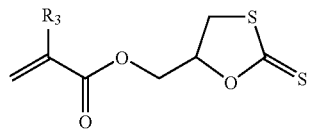

with a thiol of the following formula:

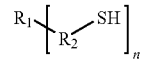

wherein n is an integer greater than or equal to two;
$R_1$ is a biodegradable or water-soluble linkage selected from the group consisting of an alpha-, omega-diol containing from C-2 to C-22 carbon atoms; an alpha-, omega-diol containing ether linkages; and a polyol;
$R_2$ is selected from the group consisting of an ester, an amide, a carbonate, an ester-amide, an orthoester, an anhydride, an imine, a phosphazene, a poly(peptide), a poly(hydroxy acid), a poly(orthocarbonate), a poly(anhydride), a poly(lactone), a poly(amino acid), a poly(carbonate), poly(phosphonate), a poly(oxaester), a poly(alkylene diglycolate), a fatty acid polyester, a poly(ester-amide), a polydepsipeptide, a poly(orthoester), poly(phosphazene), poly(ethylene glycol), poly(ethylene oxide), poly(vinyl alcohol), poly(ethylene-co-vinyl alcohol), poly(acrylic acid), poly(ethylene-co-acrylic acid), poly(ethyloxazoline), polyvinylpyrrolidone, poly(ethylene-co-vinyl pyrrolidone), poly(maleic acid), poly(ethylene-co-maleic acid), poly(acrylamide), poly(ethylenimine), poly(ethylene oxide)-co-poly(propylene oxide) block copolymers, and combinations thereof; and
$R_3$ is selected from the group consisting of hydrogen, methyl, ethyl, and propyl.

5. The process of claim 4 wherein n is an integer between 2 to 6, inclusive; $R_1$ is selected from the group consisting of ethylene glycol, 1,3-propanediol, 1,4-butanediol, 1,5-pentanediol, 1,6-hexanediol, 1,8-octanediol, 1,12-dodecanediol, diethylene glycol, triethylene glycol, tetraethylene glycol, pentaethylene glycol, hexaethylene glycol, heptaethylene glycol, and poly(ethylene glycol), glycerol, erythritol, pentaerythritol, ethoxylated pentaerythritol, dipentaerythritol, xylitol, ribitol, sorbitol, 1,2,6-hexanetriol, 1,2,4-butanetriol, maltose, sucrose, and lactose; $R_2$ is selected from the group consisting of poly(lactone), poly(oxaester), poly(hydroxy acid), poly(acrylic acid), polyvinylpyrrolidone, and poly(ethylene glycol); and $R_3$ is selected from the group consisting of hydrogen and methyl.

6. The process of claim 4 wherein n is an integer between 2 to 6, inclusive; $R_1$ is selected from the group consisting of poly(ethylene glycol), glycerol, pentaerythritol, ethoxylated pentaerythritol, and dipentaerythritol; $R_2$ is selected from the group consisting of poly(lactone) and poly(ethylene glycol); and $R_3$ is selected from the group consisting of hydrogen and methyl.

7. The process of claim 4 wherein the thiol-reactive dithiocarbonate is selected from the group consisting of (2-thioxo-1,3-oxathiolan-5-yl)methyl methacrylate and (2-Thioxo-1,3-oxathiolan-5-yl)methyl acrylate; and the thiol is selected from the group consisting of pentaerythritol tetrathioglycolate, pentaerythritol tetra(3-mercaptopropionate), dipentaerythritol hexakis(thioglycolate), and ethoxylatedpentaerythritol(PP150)tetrakis(3-mercapto propionate).

8. A polymer comprising the polymerization reaction product of the dithiocarbonate-containing macromer set forth in claim 1.

9. A polymer comprising the polymerization reaction product of the dithiocarbonate-containing macromer set forth in claim 3.

* * * * *